United States Patent [19]

Inatomi

[11] Patent Number: 4,574,343

[45] Date of Patent: Mar. 4, 1986

[54] CONTACTLESS PRESS CONTROL DEVICE

[75] Inventor: Takao Inatomi, Kanazu, Japan

[73] Assignee: Kabushiki Kaisha Komatsu Seisakusho, Tokyo, Japan

[21] Appl. No.: 427,927

[22] Filed: Sep. 29, 1982

[51] Int. Cl.[4] ...................... G05B 9/02; G01R 31/28; G01P 3/48
[52] U.S. Cl. .................................. 364/184; 364/185; 371/25; 371/27; 324/173
[58] Field of Search ....................... 364/184, 185, 186; 371/3, 25, 27; 324/173 A

[56] References Cited

U.S. PATENT DOCUMENTS

| 3,680,069 | 7/1972 | Neumann et al. | 371/3 X |
| 4,107,649 | 8/1978 | Kurihara | 371/3 |
| 4,205,301 | 5/1980 | Hisazawa | 371/3 |
| 4,363,124 | 12/1982 | Aichelmann, Jr. | 371/25 X |

FOREIGN PATENT DOCUMENTS 5599877 2/1982 Japan ...................................... 371/3

Primary Examiner—Jerry Smith
Assistant Examiner—Jon D. Grossman
Attorney, Agent, or Firm—Spensley Horn Jubas & Lubitz

[57] ABSTRACT

A contactless control device for a press having a device for checking whether an abnormality detector normally operates or not. The device of this invention is constructed to operate when power is fed to the press or when the press is stopped at its top dead center. A self-check operation generates and applies a dummy pulse to the abnormality detector. The abnormality detector generates an error signal corresponding to the dummy signal if normal. Since no error signal is generated when the abnormality detector is abnormal, the press is not operated. Operation of the press is dependent on the error signal. Whether the abnormality detector is normal or not is indicated during a self-check operation.

1 Claim, 3 Drawing Figures

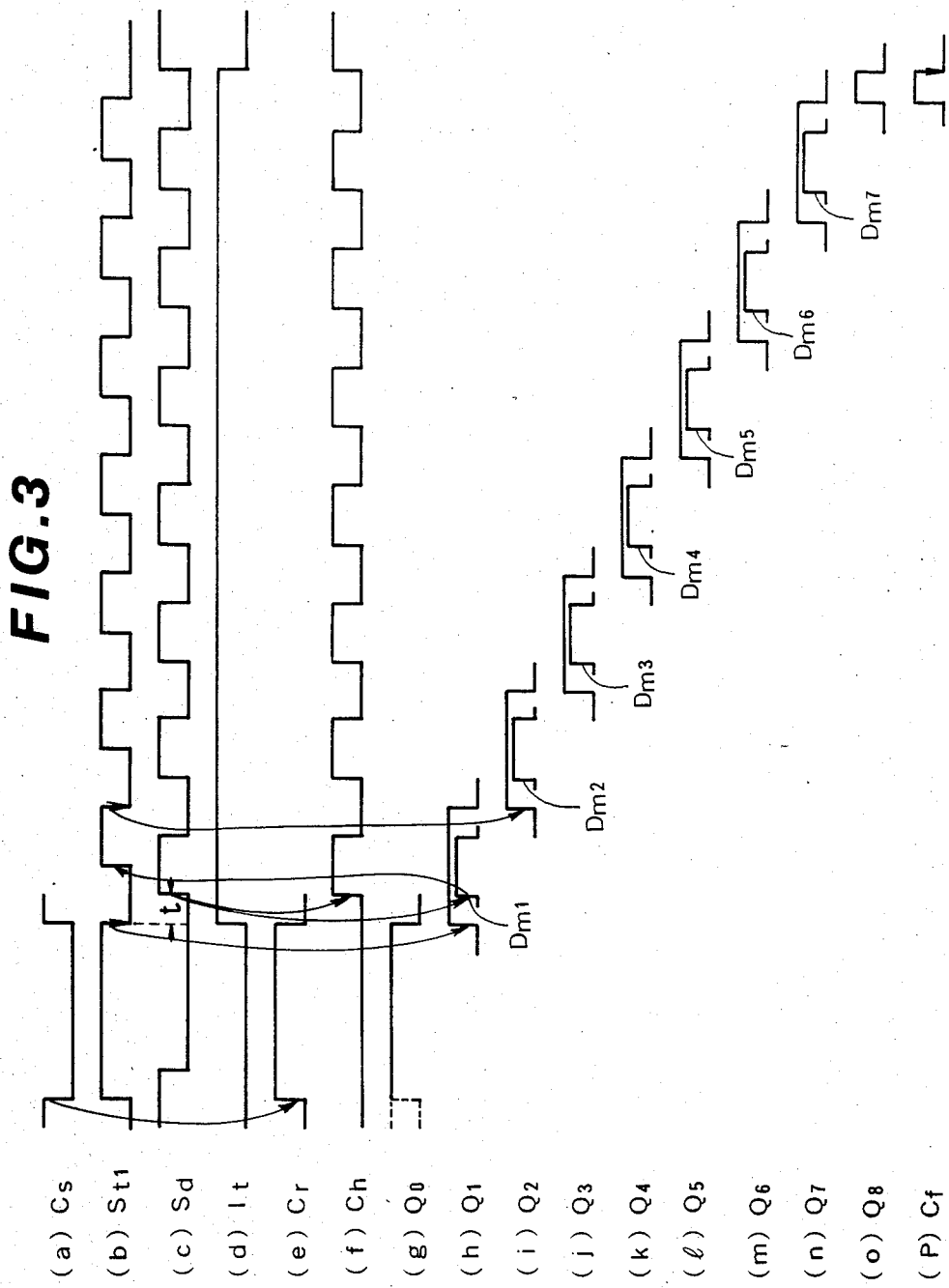

CONTACTLESS PRESS CONTROL DEVICE

BACKGROUND OF THE INVENTION

1. Field of the Invention

The present invention relates to a contactless press control device having a self check circuit.

2. Description of the Prior Art

Contactless control devices wherein the relay sequence circuit are replaced by integrated circuits have begun to be used lately as a press control device in order to improve the reliability of the press.

The prior art contactless control device comprises a control circuit to control the press operation and a fault detection circuit to detect and prevent misoperation of the press.

The present invention is directed to further improve the safety of the press operation by adding the function to judge whether or not the fault detection circuit is working. The present invention provides a contactless press control device which is able to discriminate whether or not the fault detecting circuit is functioning normally by applying a dummy signal at the time of power input and when the press has stopped at its top dead center.

According to the present invention, fault detection is performed automatically upon the input of press power and thus, input, fault of the contactless control device is detected before the press start-up. In addition, since fault detection is performed each time the press stops at its top dead center, fault of the control device can be detected before the press operation, making it possible to prevent misoperation of the press. Furthermore since the fault detection time is very short, there is no press operation delay after the press is stopped at its top dead center.

The present invention will now be described in detail with reference to the accompanying drawings in which the presently preferred embodiment of the invention is illustrated by way of example.

BRIEF DESCRIPTION OF THE DRAWINGS

FIG. 3 is a time chart for operation of the circuit in FIG. 2.

DETAILED DESCRIPTION OF THE PREFERRED EMBODIMENT

Figure 1:
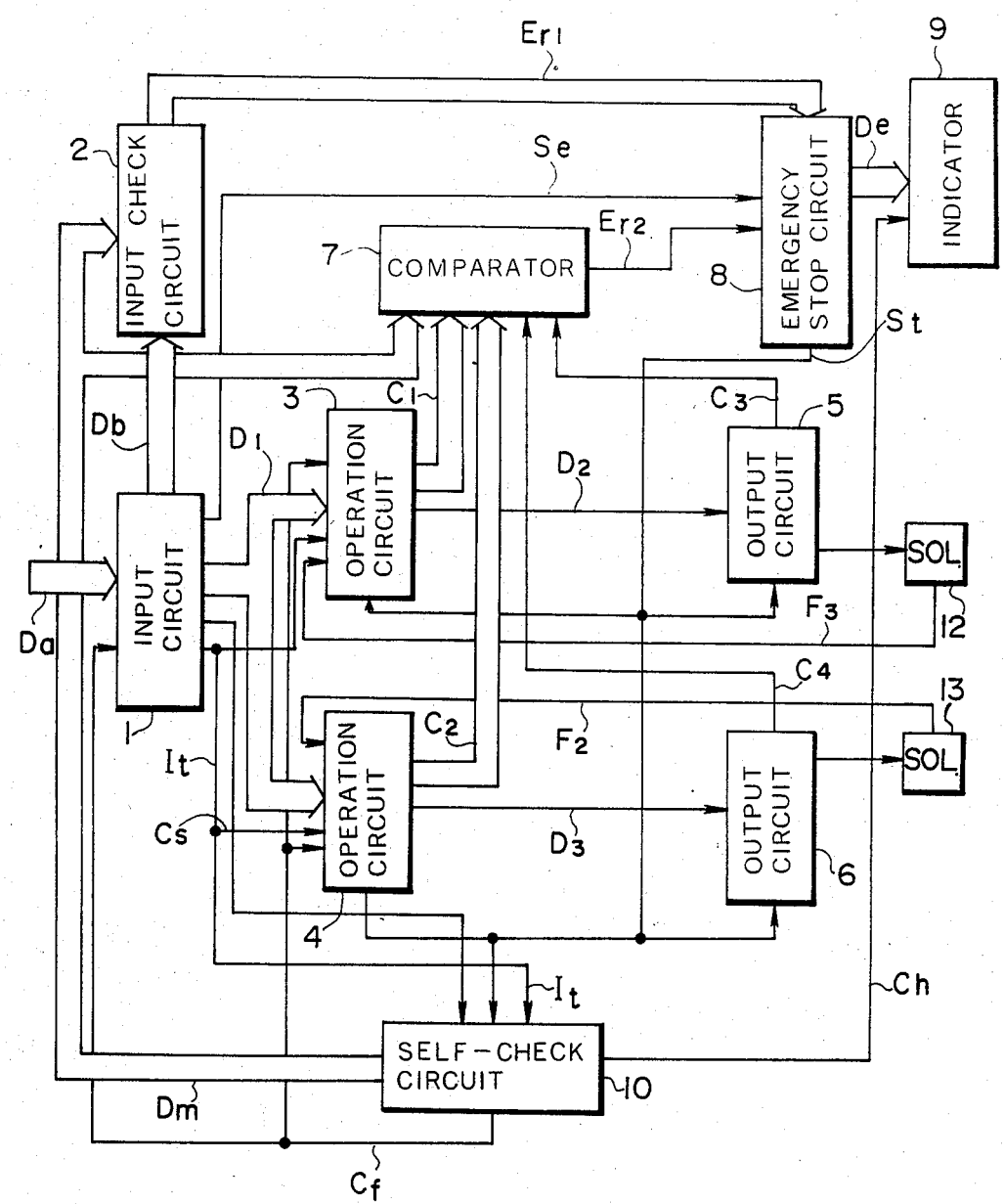
FIG. 1 is a block diagram of a preferred embodiment of the contactless press control device according to the present invention.

FIG. 1 is a block diagram of a preferred embodiment of the contactless press control device according to the present invention.

An input circuit 1 forms an input check signal Db and an input signal $D_1$ from a signal Da to be applied from the press (not shown), the input circuit applies the signal Db to an input check circuit 2, and also applies the signal $D_1$ to operation circuits 3 and 4. In addition, the input circuit 1 applies a check start signal Cs to a self-check circuit 10 when power is fed to the press or when the press has stopped at its top dead center. The input circuit 1 also applies a signal. The input check circuit 1 also applies signal $I_t$ to circuits 3 and 4 (indicating to these circuits that check is underway) and also applies this signal to the self-check circuit 10.

The input check circuit 2 applies an error signal $Er_1$ to an emergency stop circuit 8 upon the detection of abnormality in the signal Da from the signal Db previously applied to the check circuit.

The operation circuits 3 and 4 are configured identically, and apply signals which signify a state of a specified operation point to a comparator 7 as comparison signals $C_1$ and $C_2$ respectively. Likewise, output circuits 5 and 6 are configured identically, and apply signals which signify a state of a specified operation point to the comparator 7 as comparison signals $C_3$ and $C_4$. The operation circuits 3 and 4 form ON-OFF signals $D_2$ and $D_3$ for solenoids 12 and 13 which in turn control a clutch or brake from the applied signal $D_1$, and apply said signals to the solenoids 12 and 13 through the output circuits 5 and 6.

The comparator 7 compares the signals $C_1$ and $C_2$ point by point, and the difference, if any, is detected as fault. Upon the detection of fault, the comparator 7 outputs an error signal $Er_2$ to the emergency stop circuit 8.

When the signals $Er_1$ and $Er_2$ are fed, or when a stop signal Se is fed externally via the input circuit 1, the emergency stop circuit applies an emergency stop signal St to the operation circuits 3 and 4, output circuits 5 and 6, and the self-check circuit 10, and further applies an error occurrence signal De to an indicator 9. Thereupon, the operation circuits 3 and 4, and the output circuits 5 and 6 become the emergency stop state, the press operation is stopped, and the indicator 9 gives fault indication.

In addition, Feedback signals $F_3$ and $F_2$ corresponding to the operations of the solenoids 12 and 13 are fed to the operation circuits 3 and 4.

As described above, the self-check circuit 10 of the contactless press control device checks the operations of the input check circuit 2 and the comparator 7. That is, the normalness of the circuit for detecting the abnormality of the input signal Da, and the circuit for detecting the abnormality of the operation circuits 3, 4 and the output circuits 5, 6 is determined.

Figure 2:
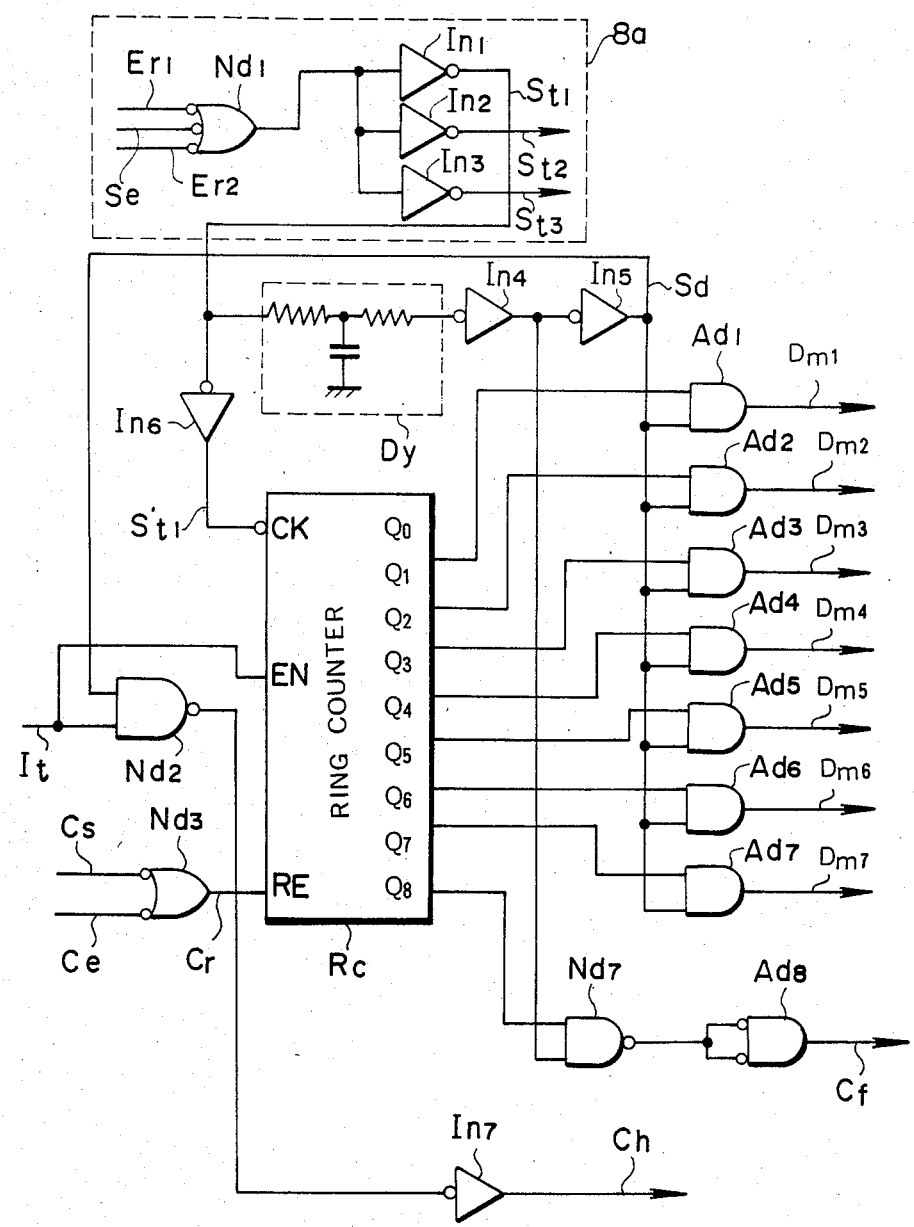
FIG. 2 is a circuit diagram showing the detail on a preferred embodiment of the self-check circuit of the contactless press control device according to the present invention.

FIG. 2 illustrates in detail a preferred embodiment of the self-check circuit of the contactless press control device according to the invention. In this figure, the part 8a is the part where emergency stop signals $St_1$-$St_3$ are generated in the emergency stop circuit 8 (Refer to FIG. 1). Signals $Er_1$, $Er_2$, and Se are fed to a NAND circuit $Nd_1$, Emergency stop signals $St_2$ and $St_3$ are fed to the operation circuits 3 and 4, and output circuits 5 and 6 respectively.

In this embodiment the operation is judged normal through the following actions. When power is fed to the press at the press start-up; and when the press stops at its top dead center, the fault detection condition is produced artificially by applying a dummy signal to the input check circuit 2 and the comparator 7, an error signal is output to the emergency stop circuit 8, an emergency stop signal is output, and the error indication is made by the indicator. The operation is judged abnormal when the error signal is not output, and error indication is not given accordingly.

When power is fed to the press, the signal Cs is fed from the input circuit 1 to the NAND circuit $Nd_3$ becomes "0" (FIG. 3(a)). As a result, the output signal Cr or the NAND circuit $Nd_3$ becomes "1" (FIG. 3(e)). This signal is fed to a reset input RE of a ring counter Rc, resetting the ring counter Rc. Then, as the signal Cs becomes "1", (FIG. 3(a)) the signal It to be fed to the enable input EN of the ring counter Rc becomes "1" (FIG. 3(d)), and the ring counter Rc becomes operable. When the signal Cs becomes "0", the signal Se is fed to the emergency stop circuit 8 from the input circuit 1, the emergency stop signal $St_1$ is inverted via an inverter $In_6$, and the signal is fed to a clock input CK of the ring counter Rc as a signal $St_1'$. In FIG. 2, the gates $Nd_1$ and $Nd_3$ are depicted as OR-gates with inverted inputs, these being functionally identical to NAND gates.

The signal $St_1$ is delayed by a specified time t via a delay circuit Dy, inverted through an inverter $In_4$, fed to the NAND circuit $Nd_7$, and further inverted through an inverter $In_5$. As a result, the signal $St_1$ is delayed by time t, and a signal Sd is formed. Signal Sd is fed to AND circuits $Ad_1$–$Ad_7$ forming dummy signals $Dm_1$–$Dm_7$, and also to a NAND circuit $Nd_2$.

Now, when the signal $St_1$ rises to "1", the output of the terminal $Q_0$ of the ring counter Rc becomes "1" (FIG. 3(g)). That is, upon the first rise of the signal $St_1$ after the press power input, the ring counter Rc is initialized.

Then, upon the fall of the signal $St_1$, the output of the terminal $Q_0$ falls, and the output of a terminal $Q_1$ rises to "1" (FIG. 3(h)). The signal Sd rises time t after the fall of the signal $St_1$. As a result, the AND circuit $Ad_1$ becomes operatable, and a dummy signal $Dm_1$ becomes "1" (FIG. 3(h)).

When the input check circuit 2 and the comparator 7 are normal, the error signal $Er_1$ or $Er_2$ is generated, as a result of the dummy signal $Dm_2$ become "1" and fed to the emergency stop circuit 8, and the signal $St_1$ becomes "1". Then, the dummy signal $Dm_1$ becomes "0" upon the fall of the signal Sd time t after the rise of the signal $St_1$. On the other hand, the output of the terminal $Q_1$ falls to "0" upon the fall of the signal $St_1$, and the output of the terminal $Q_2$ rises to "1".

Thus, the ring counter Rc is driven upon the fall of the signal $St_1$, and the output of terminals $Q_1$–$Q_7$ become "1" sequentially. At the same time, as the signal Sd becomes "1", dummy signals $Dm_1$–$Dm_7$ are sequentially formed and fed to the input check circuit 2 and the comparator 7.

The output of the NAND circuit $Nd_2$ to which the signal Sd and the signal It are fed is inverted at an inverter $In_7$, and a signal Ch is formed. This signal Ch indicates that the self-check circuit 10 is in operation. This signal Ch is also fed to the indicator 9, and indicates that the self-check is underway together with the signal De to be fed to the indicator 9.

When the ring counter is driven sequentially, dummy signals are all output, self-check completes, the output of a terminal $Q_8$ becomes "1" thereafter, and output signal of an inverter $In_4$ rises to "1", a NAND circuit $Nd_7$ becomes operatable, an AND circuit $Ad_8$ operates, and a signal Cf is output to the input circuit 1 and the operation circuits 3 and 4. As a result, the signal It is cut off, and the self-check is terminated.

When the signal Cf is fed to the operation circuits 3 and 4, a signal $D_1$ is formed, and said circuits become operable. If the start condition is fulfilled, solenoids 12 and 13 operate, the press clutch operates, and the press is started.

Dummy signals $Dm_1$–$Dm_7$ cause the input check circuit 2 or the comparator 7 to form error signals $Er_1$, $Er_2$. For example, the signal $Dm_1$ corresponds to the abnormality of the input signal Da, and signals $Dm_2$–$Dm_7$ corresponds to the abnormality of operation circuits 3 and 4. Accordingly, in case abnormality has occurred in the input check circuit 2, the error signal $Er_1$ resulting from the signal $Dm_1$ is not formed and in case abnormality has occurred in the comparator 7, the error signal $Er_2$ resulting from the signals $Dm_2$–$Dm_7$ is not formed. Thus, since no error signal is formed when fault has occurred at the input check circuit 2 or the comparator 7, no emergency stop signal $St_1$ is produced. In addition, since a signal De is not output from the emergency stop circuit 8 to the indicator 9, the indicator 9 does not give fault detection indication. On the other hand, since the signal $St_1$ is "1", signal $St_1'$ is "0", (the signal $St_1$ which has passed through the inverter $In_6$ is labeled $ST_1'$) and the signal Sd is "1". Accordingly, a signal Ch becomes "1", and the indicator 9 indicates that the self-check circuit 10 is performing fault detection.

When the input check circuit 2 and the comparator 7 are normal, the signal Ch becomes "1" and "0" alternately, and the indication by the indicator 9 flashes accordingly. On the other hand, when fault has occurred at the input check circuit 2 or the comparator 7, the signal Ch stays "1", and the indication at the indicator 9 is steady.

In this way, the occurrence of fault at the input check circuit 2 and the comparator 7 is clearly noticed.

As described above, fault detection by the self-check circuit 10 concerning the input check circuit 2 and the comparator 7 is performed at the time of press start-up, while the similar fault detection is performed with a signal Cs formed by the input circuit 1 when the press has stopped at its top dead center. When fault has occurred at the self-check circuit, no signal Cf is formed, therefore the operation circuit does not start the press.

What is claimed is:

1. A contactless control device for a press having a controller for controlling the operation of the press and an abnormality detector for detecting the abnormality of the operation of said controller, a detection of such abnormality preventing press operation, comprising:

means for generating dummy fault signals before said press is started and applying the signals to said abnormality detector, and means for detecting as a fault the state when no fault detection signal is generated from said abnormality detector upon application of each dummy fault signal, such fault detection preventing press operation, and wherein said dummy fault signals correspond to items to be checked, and an initial dummy fault signal is generated when power is fed to said press or when said press is stopped at its top dead center, and the next dummy fault signal is generated only when an abnormality is not detected for each item to be checked.

* * * * *